Sept. 18, 1956　　　　　B. A. CURLEY　　　　　2,763,800
CURRENT COLLECTOR CONTACT MEANS
Filed April 28, 1954
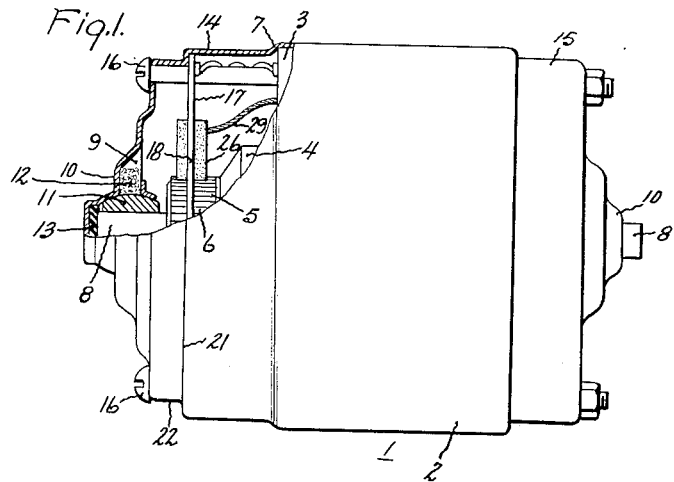
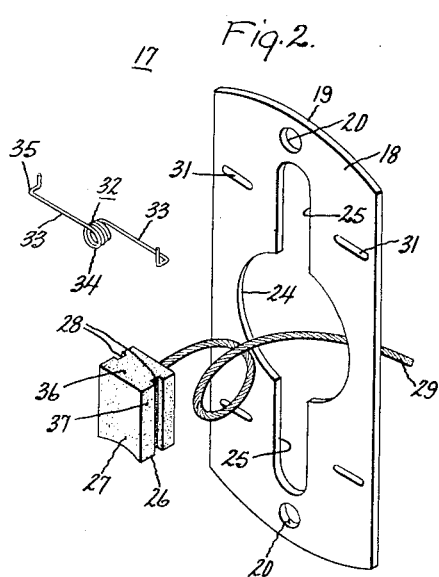
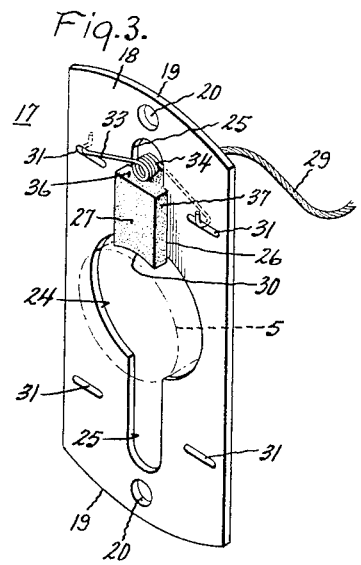
Inventor:
Bruce A. Curley
by
His Attorney

United States Patent Office 2,763,800
Patented Sept. 18, 1956

2,763,800

CURRENT COLLECTOR CONTACT MEANS

Bruce A. Curley, Fort Wayne, Ind., assignor to General Electric Company, a corporation of New York Application April 28, 1954, Serial No. 426,205

9 Claims. (Cl. 310—239)

This invention relates to dynamoelectric machines, and more particularly to current collector contact means therefor.

Small dynamoelectric machines, particularly those in the fractional horsepower categories, are essential components in many various kinds of apparatus. Such variety means that the number of such machines produced is very large. The cost of production therefore becomes an extremely important factor. This factor depends mainly on the number of elements necessary for proper functioning and the space required by the elements (and, consequently, by the machine) for a given output. These problems need to be attacked without any sacrifice whatever as to the reliability and efficiency of the machine. In the past, current collector contact mechanisms in dynamoelectric machines, for example, brush rigging for commutator type machines, have necessitated a considerable number of component parts. The standard procedure has been to provide at least a pair of brushes, tubes or similar means for holding the brushes, means for biasing the brushes toward the commutator, and means for holding the tube in place within the motor assembly. This latter item by itself frequently consists of several separate parts. It is, therefore, desirable to bring to a minimum the number of parts necessary for optimum performance by current collector contact devices.

It is, therefore an object of this invention to provide in a dynamoelectric machine improved current collector contact means which will incorporate the desirable features enumerated above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in one embodiment thereof, provides a sheet of rigid material having an opening to accommodate a commutator or slip ring and additional openings cut to accommodate current collector contact devices. The current collector contact devices, such as carbon brushes, are provided with grooves which mate with the sides of the second mentioned openings so that the brushes are held therein. Means are provided to bias the brushes downwardly in the openings toward the current collector.

In the drawing, Figure 1 is a side view, partly cut away and partly in cross section, of a dynamoelectric machine embodying the improved current collector contact means of this invention;

Figure 2 is an exploded view in perspective of the improved current collector contact means of this invention; and Figure 3 is a view in perspective of the various elements of the invention assembled into operative relationship.

Referring now to the figures of the drawing, there is shown a small commutator type electric motor, indicated by the numeral 1, which is encased in a housing 2. Motor 1 comprises a stator, partly shown at 3, a rotor, partly shown at 4, and rotatable within the stator, and a commutator 5 which is rotatable with armature 4 and has around its periphery commutator bars 6 which are insulated from each other. Housing 2 is closed at its ends by a pair of end shields 14 and 15. The housing member may be formed with a shoulder 7 where it joins end shield 14 so as to secure stator 3 in place. A shaft 8 extends through the motor and is driven by rotor 4. Shaft 8 is supported by bearings, such as 9, which are maintained within recesses 10 in end shields 14 and 15. Each bearing 9 may, as shown, have a sleeve 11 of porous material rotatably supporting shaft 8, and lubricant impregnated packing 12 around the member 11 so that lubricant will seep through the member 11 to lubricate the shaft. A thrust washer, such as 13, may also be provided within bearing 9. Through-bolts 16 are provided to secure end shields 14 and 15 and housing 2 together in assembled relationship. The apparatus described thus far is by way of illustration, and it will be apparent that this invention is applicable to other types of construction.

A current collector contact device generally indicated at 17, is maintained in radial alignment with commutator 5 within end shield 14, as will be explained below. Current collector contact means 17 includes a sheet 18 of rigid material positioned substantially perpendicular to the axis of rotation of commutator 5. This sheet may be either of metal or of insulating material; it is, however, preferable to use insulating material since this avoids the necessity of insulating sheet 18 from the conducting members with which it is in contact, as will be explained. The narrow ends of the sheet are curved, as at 19, so that when the sheet is placed within the motor end shield 14 each surface 19 abuts and conforms to the inner surface of the end shield. A pair of holes 20 are provided to accommodate through-bolts 16.

End shield 14 is provided with a shoulder 21 which extends around the end shield for the major part of its periphery. This shoulder terminates on each side of each of through-bolts 16, as shown at 22, to permit sufficient area to be present to support the through-bolt heads. The diameter of the end shield to the left of shoulder 21 is smaller than the diameter distance between surfaces 19 of sheet 18 and, therefore, shoulder 21 prevents the sheet from being moved to the left. A spring member 23 extends along each through-bolt 16 between stator 3 and the sheet 18 to maintain the sheet firmly pressed against shoulder 21 in end shield 14. Thus, the combination of shoulder 21 and spring member 23 prevents the sheet from being moved axially, and the fact that through-bolts 16 pass through holes 20 in the sheet prevents any rotational movement thereof.

A centrally located opening 24 is provided in sheet 18 to accommodate the commutator 5 of motor 1. Wherever it is desired to have a brush contacting the commutator a slot 25 extending radially away from opening 24 is cut in the sheet. In the present embodiment, for purposes of illustration, a pair of these slots is provided. A brush 26, whose face 27 is slightly greater than the width of slot 25, is provided for each of the two slots. Brush 26 has a pair of grooves 28 cut in its side faces 37 respectively; each of these grooves 28 fits over a side of the slot 25 thereby holding the brush within the slot while permitting up and down sliding motion. A lead, such as 29, is secured to the brush 26 in order to connect the brush to the motor windings in any conventional manner. It will be observed that the engagement of the grooves 28 of brush 26 with the sides of slot 25 guide the brush up and down so that its curved surface 30 is in proper engagement with the surface of commutator 5, shown in broken outline in Figure 3.

In order to bias brush 26 against commutator 5, a pair of small slots 31 are provided in sheet 18, one on each side of each slot 25. A torsion spring 32 has a pair of arms 33 extending in substantially opposite directions from the main body portion 34 of the spring. Arms 33 are each bent at their extremities into the two consecutive right angles, as at 35. This bent shape permits the ends 35 of arms 33 each to be inserted through one of slots 31 and to remain in engagement therewith. When the arms 33 are so positioned, the main body portion 34 of spring 32 is seated on the top 36 of brush 26 so as to press the brush downwardly toward commutator 5. It will be seen that spring 32 is of an extremely simple type and that it will afford a constant pressure on brush 26 as the brush wears away.

Since, in the instant embodiment, the construction is such that two brushes are provided for, a similar brush 26 and a similar spring 32 are placed in the other slot 25 diametrically opposite to the first mentioned brush assembly.

It will be seen from the foregoing that the entire current collector contact apparatus has been mounted on a single sheet of material in a secure and reliable manner. It is further obvious that no forming whatsoever of sheet 18 is necessary and that the only requirement lies in the forming of the appropriate openings therein. Furthermore, the sheet acts both as a means of mounting the brush assembly to the motor 1 and as a brush holder and guide, thus permitting elimination of the separate elements which are generally considered necessary to perform these functions. The means for biasing the brush toward the commutator is likewise completely mounted upon the sheet 18 without any necessity for any outside mounting point. It is clear that the assembly of this invention is characterized by its simplicity and ease of assembly, and by the number of ordinarily prerequisite elements which have been eliminated without detriment to the reliability or efficiency of the apparatus.

While this improved current collector contact means has been shown in connection with a commutator type machine, it will be readily apparent that it is equally applicable to a machine having slip-rings.

It will be understood that many modifications such as the shape and material of sheet 18, the number of brushes used, the means of supporting the sheet within the end shield, etc. may be practiced without departing from the scope of this invention. Therefore, while this invention has been explained by describing a particular embodiment thereof, it will be apparent that improvements and modifications may be made without departing from the scope of the invention as defined in the appended claims.

What I claim as new and desire to secure by Letters Patent of the United States is:

1. In a dynamoelectric machine having a housing and a current collector member rotatably supported within said housing, current collector contact means within said housing comprising a flat sheet of rigid material immovably secured to said housing and having an opening therein to accommodate said current collector member, said sheet further having a slot connecting with said opening, a brush thicker than said sheet having grooves formed on opposite sides, said brush being slidably mounted in said slot by engagement of the sides of said slot with said grooves respectively, said sheet including insulating material electrically separating said brushes and means biasing said brush means against said current collector member.

2. In a dynamoelectric machine having a housing and a current collector member rotatably supported within said housing, a flat sheet of rigid material immovably secured within said housing and having an opening therein to accommodate said current collector member, said sheet being substantially perpendicular to the axis of rotation of said current collector member and having a slot connecting with said first opening, a brush thicker than said sheet having grooves formed on opposite sides, said brush being slidably mounted in said slot by engagement of the sides of said slot with said grooves respectively, said sheet including insulating material electrically separating said brushes, and means biasing said brush means against said current collector member.

3. In a dynamoelectric machine having a housing and a current collector member rotatably supported within said housing, a flat sheet of rigid insulating material immovably secured within said housing substantially perpendicular to the axis of rotation of said current collector member and having a round centrally located opening therein to spacedly receive said current collector member, said sheet having a pair of diametrically opposite radial slots extending from said opening, a pair of brushes each having a groove in two oppositely disposed surfaces, said brushes being slidably mounted in said slots respectively by engagement of the sides of said slots with said grooves respectively, and means biasing each of said brushes into said opening against said current collector member.

4. In a dynamoelectric machine having a housing and a current collector member rotatably supported within said housing, a flat sheet of rigid insulating material immovably secured within said housing substantially perpendicular to the axis of rotation of said current collector member and having a round centrally located opening therein to spacedly receive said current collector member, said sheet having a pair of diametrically opposite radial slots extending from said opening, a pair of brushes each having a groove in two oppositely disposed surfaces, said brushes being slidably mounted in said slots respectively by engagement of the sides of said slots with said grooves respectively, said sheet having four relatively small apertures formed respectively on each side of each of said slots, and a pair of torsion springs, each of said springs having a body portion positioned in one of said slots on one of said brushes and a pair of arms extending in substantially opposite directions, each of said arms being anchored in one of said apertures whereby said body portion presses on said one brush to bias the same into said opening and against said current collector member.

5. In a dynamoelectric machine having a housing and a current collector member rotatably supported within said housing, a flat sheet of rigid insulating material immovably secured within said housing substantially perpendicular to the axis of rotation of said current collector member and having a round centrally located opening therein to spacedly receive said current collector member, said sheet having a pair of diametrically opposite radial slots extending from said opening, a pair of brushes each having a groove in two oppositely disposed surfaces, the bottoms of each two oppositely disposed grooves being separated by a distance not exceeding the width of said slot and the tops thereof being separated by a distance in excess of the width of said slots, said brushes being slidably mounted in said slots respectively by engagement of the sides of said slots with said grooves respectively, said sheet having four relatively small apertures formed respectively on each side of each of said slots, and a pair of torsion springs, each of said springs having a body portion positioned in one of said slots on one of said brushes and a pair of arms extending in susbtantially opposite directions, each of said arms being anchored in one of said apertures whereby said body portion presses on said one brush to bias the same into said opening and against said current collector member.

6. In a dynamoelectric machine having a housing and a current collector member rotatably supported within said housing, a flat sheet of rigid insulating material immovably secured within said housing substantially perpendicular to the axis of rotation of said current collector member and having a round centrally located opening therein to spacedly receive said current collector member, said sheet having a pair of diametrically opposite radial slots extending from said opening, a pair of brushes each having a groove in two oppositely disposed surfaces, said brushes being slidably mounted in said slots respectively by engagement of the sides of said slots with said grooves respectively, and a pair of torsion springs each having arms secured to said sheet and a body portion intermediate said arms and disposed within one of said slots whereby each of said springs biases one of said brushes against said current collector member.

7. In a dynamoelectric machine having a housing including an end shield and a current collector member rotatably secured within said housing, said end shield having a shoulder extending at least partly around its periphery substantially in radial alignment with said current collector member, a flat sheet of rigid insulating material having at least part of one side abutting the inner surface of said shoulder, means abutting the other side of said sheet to maintain it firmly against said shoulder, said sheet having a substantially round opening therein spacedly to receive said current collector member and a pair of substantially oppositely disposed slots extending from said opening, a pair of brushes each having a groove in two oppositely disposed surfaces, said brushes being slidably mounted in said slots respectively by engagement of the sides of said slots with said grooves respectively, and a pair of torsion springs each having arms secured to said sheet and a body portion intermediate said arms and disposed within one of said slots whereby each of said springs biases one of said brushes against said current collector member.

8. In a dynamoelectric machine having a housing including an end shield and a current collector member rotatably secured within said housing, said end shield having a shoulder extending at least partly around its periphery, substantially in radial alignment with said current collector member, a flat sheet of rigid insulating material having at least part of its periphery in engagement with the inner surface of said end shield and having at least part of one side abutting the inner surface of said shoulder, means abutting the other side of said sheet to maintain it firmly against said shoulder, said sheet having a small hole adjacent the edge thereof, fastening means securing together said housing and said end shield and adapted to pass through said hole thereby to prevent rotation of said sheet, said sheet having a susbtantially round opening therein to spacedly receive said current collector member and a pair of substantially oppositely disposed slots extending from said opening, a pair of brushes each having a groove in two oppositely disposed surfaces, said brushes being slidably mounted in said slots respectively by engagement of the sides of said slots with said grooves respectively, and a pair of torsion springs each having arms secured to said sheet and a body portion intermediate said arms and disposed within one of said slots whereby each of said springs biases one of said brushes against said current collector member.

9. In a dynamoelectric machine having a housing including an end shield and a current collector member rotatably secured within said housing, said end shield having a shoulder extending at least partly around its periphery, substantially in radial alignment with said current collector member, a flat sheet of rigid insulating material having two oppositely disposed edges curved to abut the inner surface of said end shield and having part of one side abutting the inner surface of said shoulder, said sheet having a pair of holes therein respectively located adjacent said oppositely disposed edges, a pair of throughbolts for maintaining said machine operatively assembled extending respectively through said holes, spring means adjacent said bolts respectively and abutting the other side of said sheet to maintain it firmly against said shoulder, said sheet having a substantially round opening therein to spacedly receive said current collector member and a pair of substantially oppositely disposed slots extending from said opening, a pair of brushes each having a groove in two oppositely disposed surfaces, the bottoms of each two oppositely disposed grooves being separated by a distance not exceeding the width of said slot and the tops thereof being separated by a distance in excess of the width of said slots, said brushes being slidably mounted in said slots respectively by engagement of the sides of said slots with said grooves respectively, said sheet having four relatively small apertures formed respectively on each side of each of said slots, and a pair of torsion springs, each of said springs having a body portion positioned in one of said slots on one of said brushes and a pair of arms extending in substantially opposite directions, each of said arms being anchored in one of said apertures whereby said body portion presses on said one brush to bias the same into said opening and against said current collector member.

References Cited in the file of this patent
UNITED STATES PATENTS

| | | |
|---|---|---|
| 1,240,738 | Lee | Sept. 18, 1917 |
| 1,686,324 | Hillix | Oct. 2, 1928 |
| 2,683,828 | Staak | July 13, 1954 |

FOREIGN PATENTS

| | | |
|---|---|---|
| 25,294 | Austria | Aug. 10, 1906 |
| 866,525 | Germany | Feb. 9, 1953 |